United States Patent
Haid et al.

(10) Patent No.: US 10,360,117 B2
(45) Date of Patent: Jul. 23, 2019

(54) METHOD AND APPARATUS FOR PERFORMING CHECKPOINTING ON A NETWORK DEVICE

(71) Applicant: STRATUS TECHNOLOGIES BERMUDA LTD., Hamilton (BM)

(72) Inventors: Steven Michael Haid, Bolton, MA (US); Lei Cao, Westford, MA (US); Aaron Tyrone Smith, Sudbury, MA (US)

(73) Assignee: Stratus Technologies Bermuda Ltd., Hamilton (BM)

(*) Notice: Subject to any disclaimer, the term of this patent is extended or adjusted under 35 U.S.C. 154(b) by 191 days.

(21) Appl. No.: 15/626,374

(22) Filed: Jun. 19, 2017

(65) Prior Publication Data

US 2017/0364425 A1 Dec. 21, 2017

Related U.S. Application Data

(60) Provisional application No. 62/352,241, filed on Jun. 20, 2016.

(51) Int. Cl.
*G06F 11/00* (2006.01)
*G06F 11/20* (2006.01)
(Continued)

(52) U.S. Cl.
CPC ...... *G06F 11/2028* (2013.01); *G06F 9/45558* (2013.01); *G06F 11/1407* (2013.01); *G06F 11/1466* (2013.01); *G06F 11/1484* (2013.01); *G06F 11/2097* (2013.01); *G06F 2009/45575* (2013.01); *G06F 2009/45579* (2013.01); *G06F 2009/45591* (2013.01); *G06F 2009/45595* (2013.01); *G06F 2201/815* (2013.01)

(58) Field of Classification Search
CPC .................................................. G06F 11/2018
See application file for complete search history.

(56) References Cited

U.S. PATENT DOCUMENTS

| 8,806,266 B1 | 8/2014 | Qu et al. |
| 2009/0113109 A1 | 4/2009 | Nelson et al. |

(Continued)

FOREIGN PATENT DOCUMENTS

| WO | 2015102874 | 7/2015 |
| WO | 2015102875 | 7/2015 |

*Primary Examiner* — Dieu Minh T Le
(74) *Attorney, Agent, or Firm* — K&L Gates LLP

(57) ABSTRACT

A checkpointing method in a network device fault tolerant system using virtual machines. In one embodiment, the network device has an input port, an output port, an active virtual machine and a standby virtual machine, a network application on the active virtual machine which manipulates data present on the input port and transmits the manipulated data from the output port; a checkpoint engine on the active virtual machine; and an interface agent, on the active virtual machine, having callable functions to move data from the input port to the output port. The method includes the steps of determining, by the checkpoint engine, that a checkpoint is required; requesting by the checkpoint engine that the interface agent quiescent itself; returning, by the interface agent to the network application, an indicator that no packets are available regardless of whether or not packets are arriving at the input port.

5 Claims, 6 Drawing Sheets

(51) Int. Cl.
*G06F 9/455* (2018.01)
*G06F 11/14* (2006.01)

(56) References Cited

U.S. PATENT DOCUMENTS

2010/0107158 A1* 4/2010 Chen .................. G06F 11/1438
                                                    718/1
2015/0081632 A1* 3/2015 Jacobs ................ G06F 11/1407
                                                    707/625

* cited by examiner

```
while true
    do
        num_packets_rcvd = call poll_mode_driver_recv_packets(port_1);
    while num_packets_rcvd equals 0                                    (STEP 10)

loop over the packets that have been received                      (STEP 14)
        update the packet header MAC addresses
    endloop num_packets_to_send = num_packets_rcvd                             (STEP 18)

call poll_mode_driver_send_packets(port_2, num_packets_to_send);   (STEP 22)
endwhile
```

FIG. 3

METHOD AND APPARATUS FOR PERFORMING CHECKPOINTING ON A NETWORK DEVICE

RELATED APPLICATIONS

This application claims priority to U.S. Provisional Patent Application No. 62/352,241 filed on Jun. 20, 2016, the entire disclosure of which is incorporated herein by reference.

FIELD OF THE INVENTION

The invention relates generally to a method and apparatus for checkpointing in a fault tolerant system and more specifically checkpointing in a fault tolerant network device utilizing virtual machines.

BACKGROUND OF THE INVENTION

Fault tolerant systems support computer architectures that experience only a few minutes of downtime a year. One way of achieving extended computing uptime is to use a redundant computing system of two computers. One computer, the active computer, actively makes calculations while the second computer, the standby computer, is idle or on standby ready to resume calculations in case the active computer experiences some failure. In these systems, the information about the state of the active computer and data memory must be saved periodically to the standby computer so that the standby computer can substantially take over at the point in the calculations where the active computer experienced a failure.

To synchronize the state of operations for the two computers, checkpointing is used. In checkpointing, the active processor halts, either periodically or as a result of a specific event, and sends its data about its current state to the standby computer. During the checkpointing operation, the host computer is halted and is not performing useful calculations. The length of the checkpointing interval needs to be kept at a minimum while still providing sufficient time for the requisite checkpoint operations to take place. Because of the nature of checkpointing data, the data must be complete and in the correct order on the standby computer when the data is acted upon or committed. In addition, various applications in the telecommunications industry impose additional high bandwidth requirements which can further negatively impact checkpointing and certain computing models.

A telecommunications environment includes network devices that act as routers, firewalls, and other devices providing various network functionality. Typically, each of these network devices comprises expensive specialty hardware providing one or more of the network functions. As additional functionality is required, additional pieces of hardware are installed in the network. This hardware-intensive system is expensive to construct and maintain. In general, in a telecom environment, implementing a fault tolerant system with checkpointing has not been feasible. This follows because the network gating associated with various traditional checkpointing solutions introduces significant network latency. Checkpointing in a fault tolerant system typically adds too much latency to be feasible in a telecommunications network due to the high rate of packet transfers. In addition, replicating network data in a telecommunications environment has also been unworkable because performance is impacted. The performance impact on such a network arises because significant network and computing resources are required to replicate network data as part of a checkpointing process.

The invention addresses this need and others relating to implementing fault tolerance solutions using checkpointing in various networking environments.

SUMMARY OF THE INVENTION

In one aspect, the disclosure relates to performing a checkpointing operation in a network device fault tolerant system using virtual machines. In one embodiment, the network device has an input port, an output port, an active virtual machine and a standby virtual machine, a network application on the active virtual machine which manipulates data present on the input port and transmits the manipulated data from the output port; a checkpoint engine on the active virtual machine; and an interface agent on the active virtual machine, having callable functions to move data from the input port to the output port. In another embodiment, the method includes the steps of determining, by the checkpoint engine, that a checkpoint is required; requesting by the checkpoint engine that the interface agent quiesce itself; returning, by the interface agent to the network application, an indicator that no packets are available regardless of whether or not packets are arriving at the input port; determining, by the interface agent, if there are additional packets being processed by the network application and if not, setting an indication of quiescence and if so, continuing to check for additional packets being processed; determining, by the checkpoint engine, if an indication of quiescence has been set by the interface agent, and if so, declaring a checkpoint, and if not, continuing to check for the quiescence indication; if the checkpoint is declared, pause the active virtual machine copy memory data; copy the state data of the active virtual machine; resume the active virtual machine; indicate the checkpoint is complete; restart the interface agent; and transfer the copy of memory data and the copy of state data from the active virtual machine to the standby virtual machine. In one embodiment, the interface agent is a callable library. In another embodiment, the callable library is a DPDK library.

In another aspect, the disclosure relates to a method of bringing the standby virtual machine to the active state. In one embodiment, the method includes the steps of: determining, by a checkpoint engine of the standby virtual machine, that the active virtual machine is no longer functioning properly; promoting itself, by the standby virtual machine, to be the active virtual machine; applying the most recent checkpoint received from the previously active virtual machine; setting a failover flag by the newly-promoted active virtual machine; starting the newly-active virtual machine at the state set by the last checkpoint; initializing, by the interface agent, the network adapter hardware and the memory buffer holding the incoming packets when the interface agent detects that the failover occurred flag has been set; and continuing with normal processing.

BRIEF DESCRIPTION OF THE DRAWINGS

The figures are not necessarily to scale, emphasis instead generally being placed upon illustrative principles. The figures are to be considered illustrative in all aspects and are not intended to limit the invention, the scope of which is defined only by the claims. The present description will be best understood by reference to the specification and the drawings in which:

FIG. 3 is pseudocode of an embodiment of a method of using a virtual machine as a router;

DESCRIPTION OF A PREFERRED EMBODIMENT

Figure 1:
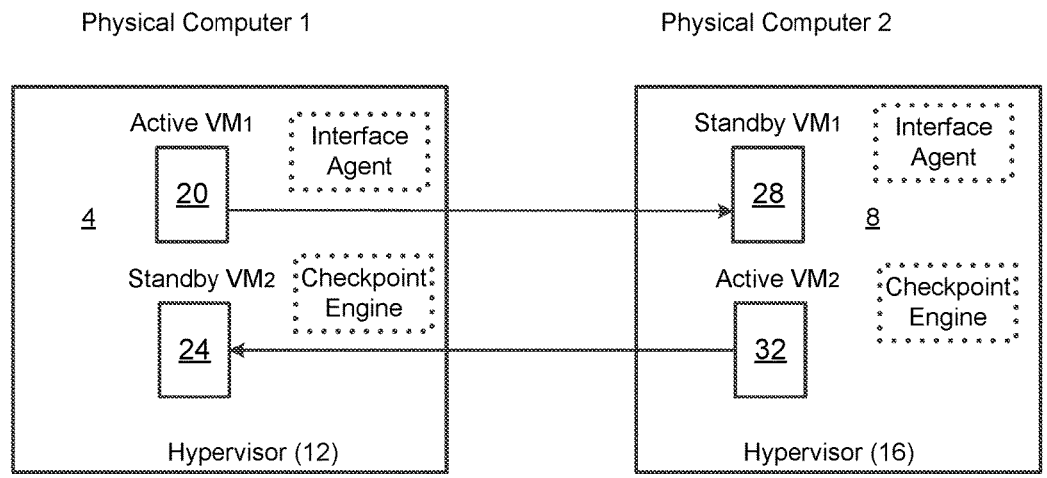
FIG. 1 is a block diagram of an embodiment of two physical computers each with virtual machines acting in a fault tolerant configuration that includes one or more agents and checkpointing engines according to an embodiment of the disclosure.

In a virtual machine system, each physical computer (4, 8) includes an operating system termed the hypervisor (12, 16) and one or more virtual machines (20, 24, 28, 32), each having its own virtual operating system. Each virtual machine (20, 24, 28, 32) is capable of executing one or more applications. Referring to FIG. 1, a virtual machine on one computer can act as the standby virtual machine (24, 28) for an active virtual machine (20, 32) on the other computer. In this way, a system of two physical computers with virtual machines can form a redundant fault tolerant system of virtual machines.

Each active virtual machine on one computer requires its own checkpoint data and must transfer at least portions of that data to a standby virtual machine on the standby computer. Checkpointing several virtual machines can require a significant amount of time and is complicated to perform in a timely and organized manner. The checkpointing delay is especially important in the case of redundant fault tolerant virtual systems operating in a telecommunications environment.

A telecommunications environment includes network devices that act as routers, firewalls, and other devices providing various network functionality. Typically, each of these network devices comprises expensive specialty hardware providing one or more of the network functions. As additional functionality is required, additional pieces of hardware are installed in the network. This hardware-intensive system is expensive to construct and maintain.

Recently, a network model has been developed in which the system is constructed of servers each running one or more virtual machines configured to run applications providing the required network functions rather than using individual pieces of specialty hardware. In such a system, a server may have one virtual machine acting as a router, one acting as a firewall, etc. When additional functionality is required by the network, for example requiring the addition of another router, the server can simply create another virtual machine with a router application without the expense of adding additional physical hardware. By interconnecting two servers each with virtual machines, a redundant fault tolerant router system may be created.

Figure 2:
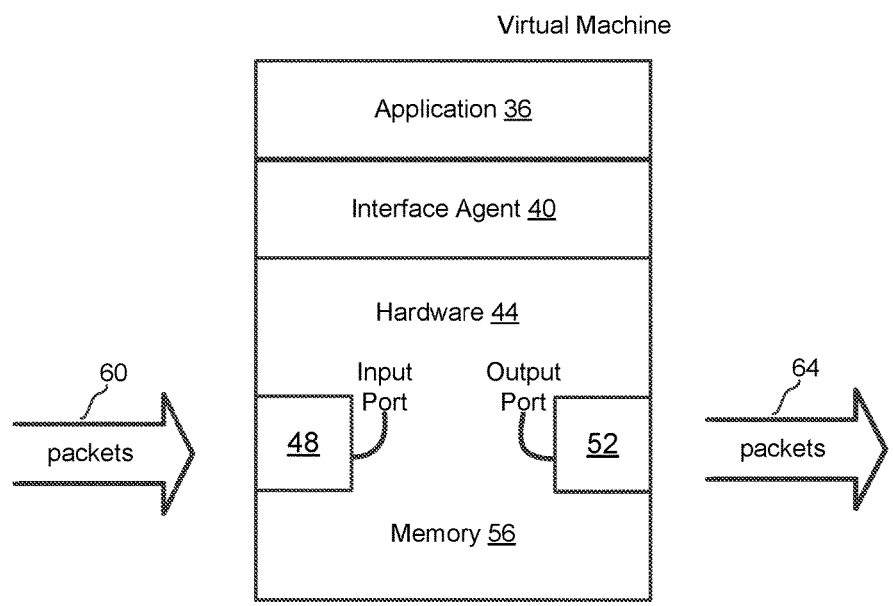
FIG. 2 is a block diagram of an embodiment of a virtual machine used for a telecommunication application such as a component of a network switching fabric.

Referring to FIG. 2, in this model, a virtual machine includes an application program (36) such as a router, an interface agent (40) such as a callable library that allows the application program (36) to access the hardware (44) of the physical machine, and the associated physical components such as an input port (48), an output port (52) and memory (56). In one embodiment, the interface agent (40) is a Data Plane Development Kit (DPDK) Library from Intel® (Santa Clara, Calif.). In the case of a router, packets of data (60) arrive at the input port (48) and are provided by the interface agent (40) to the application program (36). The application program (36) manipulates the data and returns it to the interface agent (40) for presentation to the output port (52) for retransmission as outward bound packets (64).

In more detail, an example of the pseudocode to receive data from the input port and deliver it to the output port is shown in FIG. 3. The acquisition and transmission of packets are performed by the polling of the input port by the interface agent (40). When the application program (36) wishes to receive packets, it requests packets from the interface agent (40). The interface agent (40) continually polls the input port (in this case port 1) as long as the number of received packets is zero (Step 10). When the number of received packets is not zero, the interface agent (40) returns the number of packets (num_packets_rcvd) to the application program (36). The application program (36) then updates the MAC address for each of the packets (60) received (Step 14) and the number of packets to be retransmitted (num_packets_to_send) is set to the number of packets previously received (Step 18) and the interface agent (40) sends the packets to the transmission port (in this case port 2) (Step 22).

Although this use of a virtual machine provides the needed functionality, checkpointing in current virtual machines in a fault tolerant system typically adds too much latency to be useful due to the high rate of packet transfer. Because of the high rate at which telecommunications packets arrive at the input port, a way must be found to provide checkpointing for virtual machines that does not increase the latency of the flow of data through the routing virtual machine.

To perform a checkpoint, the active virtual machine (20, 32) must be in a stable state, with its memory quiesced or held static. To do this, it is necessary to prevent the application program (36) from receiving additional packets for the application program (36) to manipulate and to allow the application program (36) to complete manipulation of any packet it has already received and to transmit it from the output port. Once the memory (56) is stable or unchanged, the checkpointing can take place and once the checkpointing is completed, the activity of the device may continue.

Figure 4:
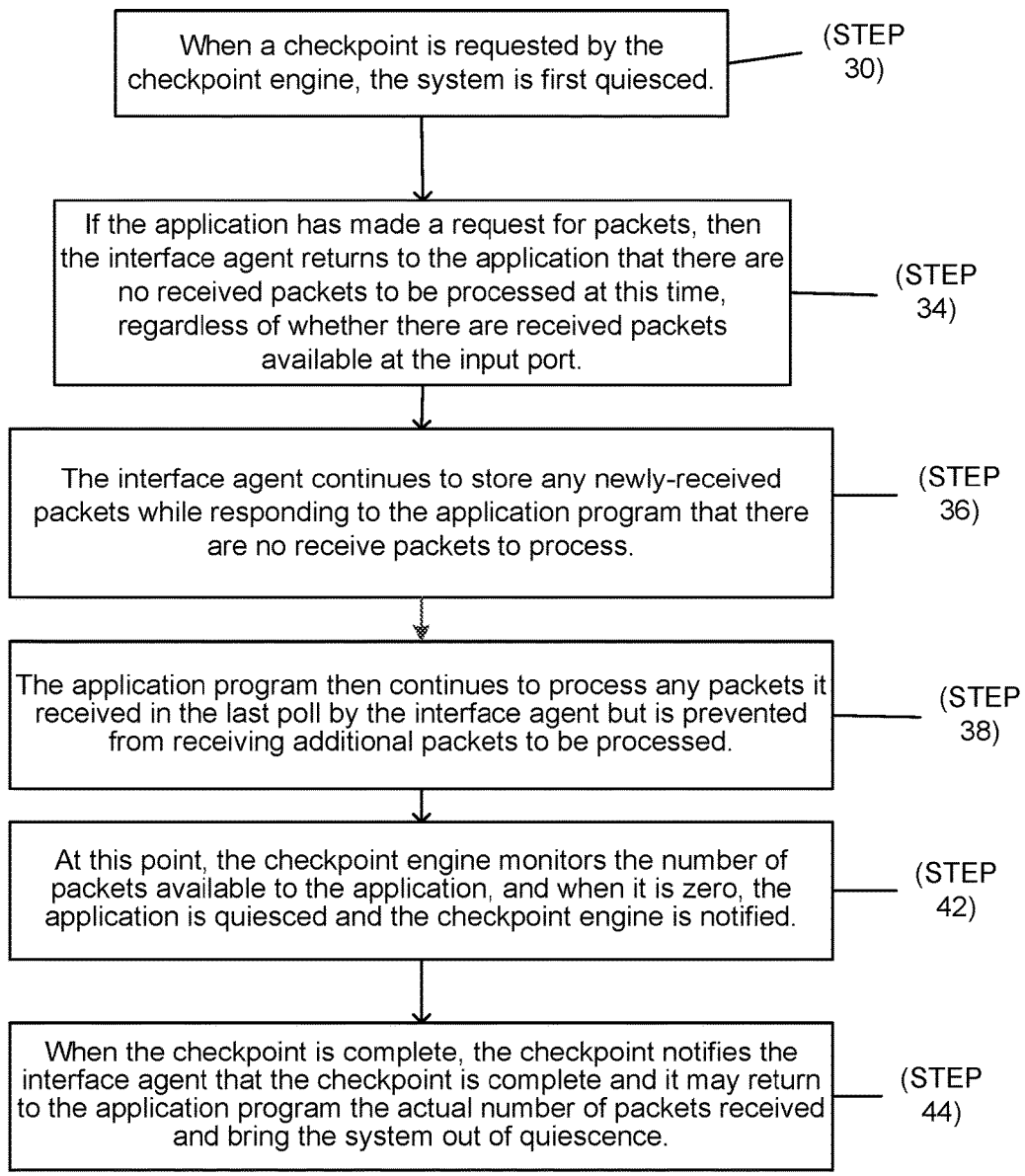
FIG. 4 is a flow diagram of an embodiment of a method of checkpointing performed in accordance with the present disclosure.

Referring to FIG. 4, when a checkpoint is requested by the checkpoint engine, the system is first quiesced (Step 30). To do this, the packets previously received must be cleared from memory (56) by being manipulated by the application program (36) and transmitted. If the application program (36) makes a request for packets once the intention to checkpoint is announced, then the interface agent (40) informs the application program (36) that there are no received packets to be processed at this time, regardless of whether there are received packets available at the input port (Step 34). The interface agent (40) continues to store any newly-received packets while responding to the application program that there are currently no received packets to process (Step 36). The application program (36) then continues to process any packets it received in the last poll by the interface agent (40) but is prevented from receiving additional packets to be processed (Step 38).

At this point, the checkpoint engine monitors the number of packets in use by the application by monitoring a counter in the interface agent. The counter in the interface agent is incremented by the interface agent whenever a packet is provided to the application and decremented by the interface agent whenever the packet is returned by the application to the interface agent, and when it is zero, the application is defined as quiesced and the checkpoint engine is notified so that a checkpoint can be declared (Step 42). When the checkpoint is complete, the checkpoint engine notifies the interface agent that the checkpoint is complete and the interface agent may return to the application program the actual number of packets received and bring the system out of quiescence (Step 44).

Figure 5A:
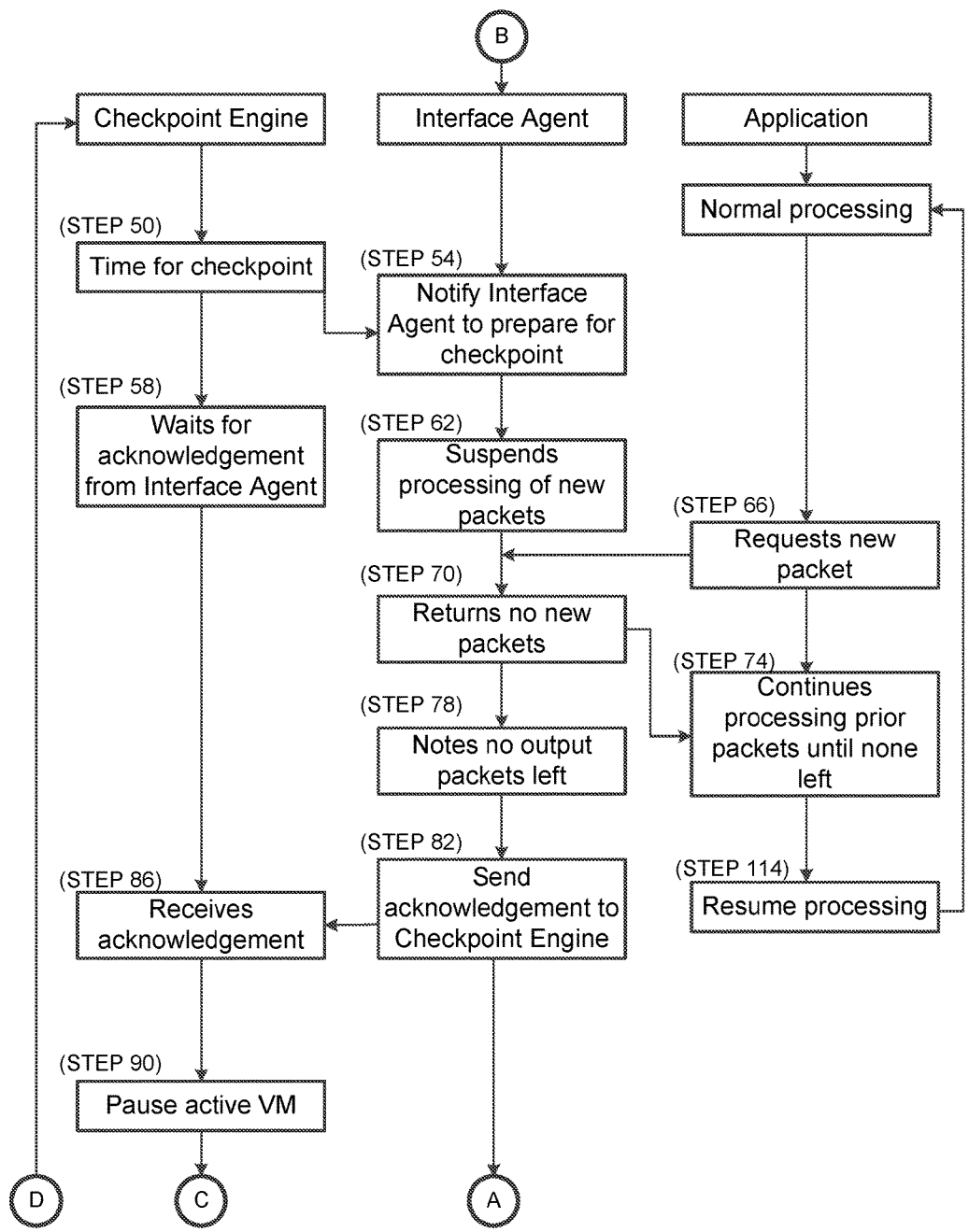
FIGS. 5A and 5B are a flow diagram of the steps of an embodiment of a complete checkpointing operation under normal circumstances performed in accordance with the present disclosure.
Figure 5B:
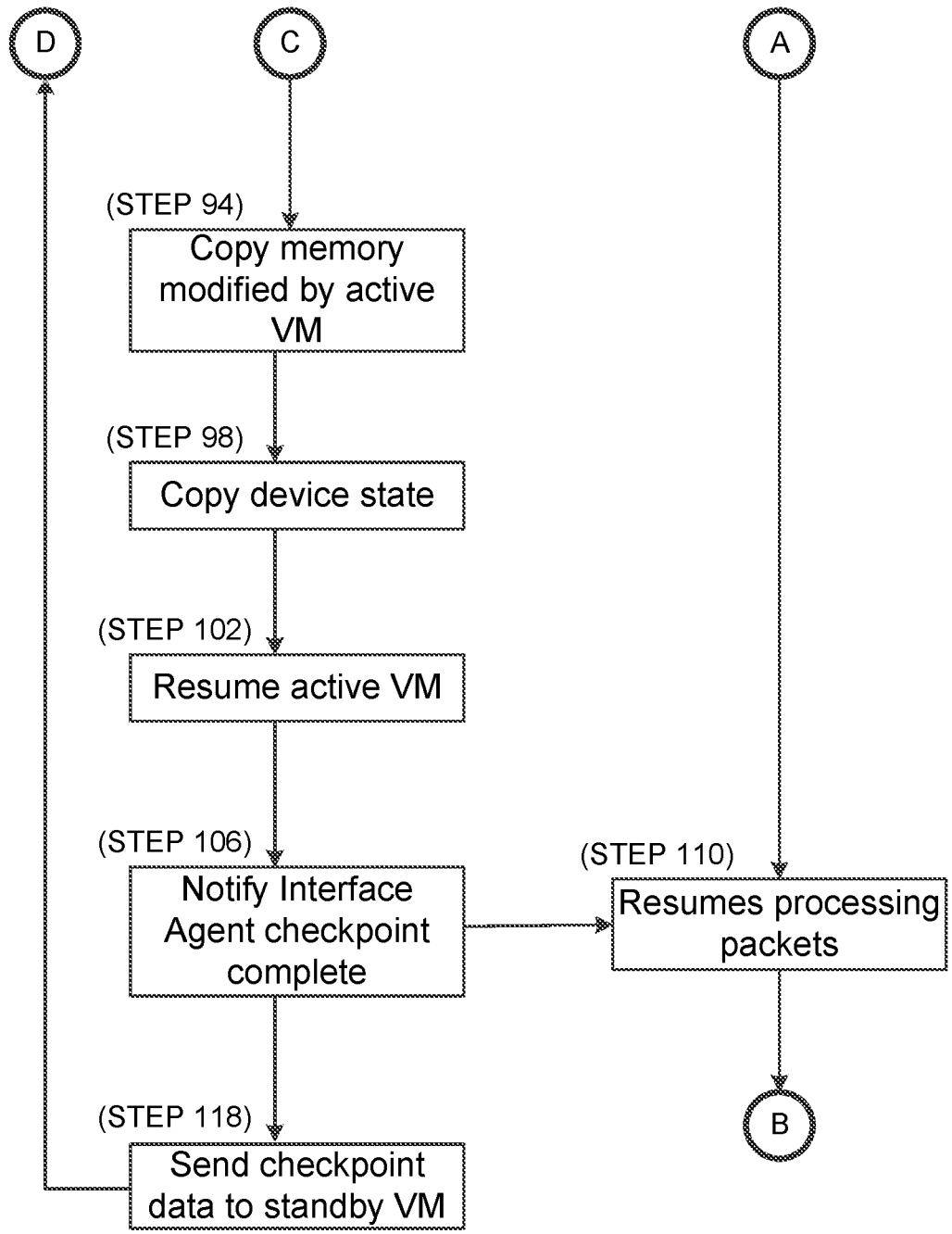

FIGS. 5A and 5B depict an embodiment of a complete checkpoint operation under normal conditions as performed by the method of the disclosure. When the checkpoint engine determines there is a need for a checkpoint (Step 50), either due to checkpoint periodicity or some other checkpoint measurement such as number of memory accesses, the checkpoint engine notifies the interface agent to prepare for a checkpoint (Step 54) and then waits for an acknowledgement (Step 58) that the system is quiesced and the memory is stable.

The interface agent then suspends (Step 62) processing of arriving packets and if the application program requests a packet (Step 66), notifies the application program that there are no additional packets to process (Step 70). The application program continues (Step 74) to process the packets previously received and the interface agent presents the processed packets to the output port for transmission. Once the last packet has been transmitted (Step 78), the interface agent acknowledges (Step 82) to the checkpoint module that the system is quiesced.

The checkpoint engine receives the acknowledgement (Step 86). Next, the checkpoint engine requests that the hypervisor pause (Step 90) the active virtual machine and copies the portion of the memory (Step 94), except for the packet input memory, which has been modified by the virtual machine since the last checkpoint and copies the state of the active virtual machine (Step 98), except for the network adapter hardware. At this point, the checkpoint engine requests that the hypervisor resume the active virtual machine (Step 102).

The checkpoint engine then notifies (Step 106) the interface agent that the checkpoint is complete. The interface agent then resumes processing (Step 110) the incoming packets and the application program resumes manipulating the packets (Step 114). The checkpoint engine sends the copied memory and active virtual machine state to the standby virtual machine (Step 118). The checkpoint engine then awaits the next checkpoint.

Figure 6:
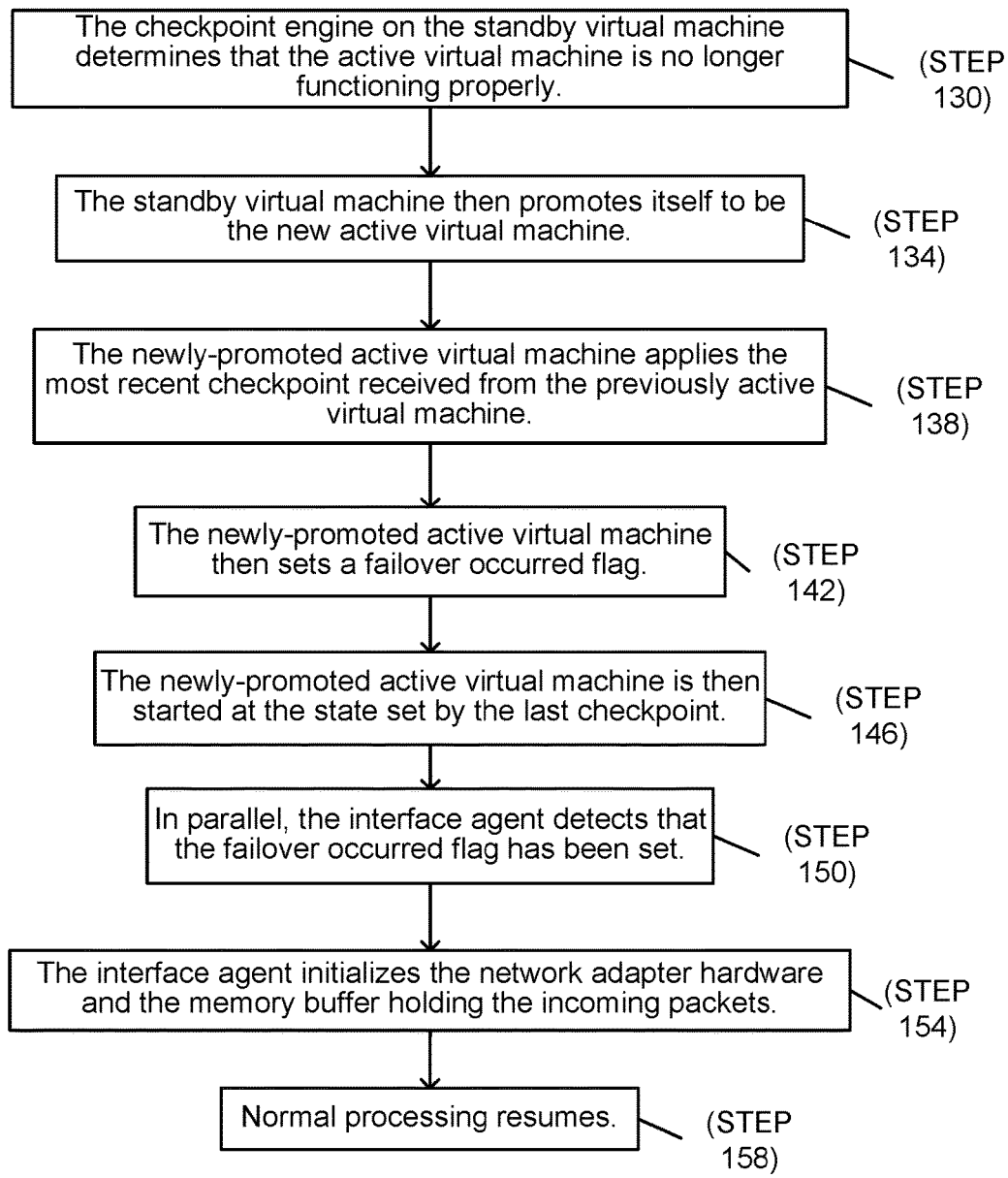
FIG. 6 is a flow diagram of the steps of an embodiment of a failover operation performed in accordance with the present disclosure.

Referring to FIG. 6, in case of a failure of the active virtual machine, the following steps are performed to bring the standby virtual machine to the active state. First, the checkpoint engine on the standby virtual machine determines that the active virtual machine is no longer functioning properly (Step 130). The standby virtual machine then promotes itself to be the active virtual machine (Step 134) and applies the most recent checkpoint received from the previously active virtual machine (Step 138). The newly-promoted active virtual machine then sets a failover occurred flag (Step 142) so that the other components of the system can act appropriately. The newly-active virtual machine is then started at the state set by the last checkpoint (Step 146).

In parallel, when the interface agent detects that the failover occurred flag has been set (Step 150), the interface agent initializes the network adapter hardware and the memory buffer holding the incoming packets (Step 154). At this point, normal processing continues (Step 158).

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "checkpointing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the disclosure. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the disclosure. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionalities of the systems and methods as SaaS.

The examples presented herein are intended to illustrate potential and specific implementations of the present disclosure. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," "interface agent" or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc.), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

The aspects, embodiments, features, and examples of the disclosure are to be considered illustrative in all respects and are not intended to limit the disclosure, the scope of which is defined only by the claims. Other embodiments, modifications, and usages will be apparent to those skilled in the art without departing from the spirit and scope of the claimed invention.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method for checkpointing in a network device having an input port, an output port, an active virtual machine, and a standby virtual machine, a network application on the active virtual machine which manipulates data present on the input port and transmits the manipulated data from the output port; a checkpoint engine on the active virtual machine; and an interface agent on the active virtual machine, having callable functions to move data from the input port to the output port, the method comprising the steps of:

determining, by the checkpoint engine, that a checkpoint is required;

requesting, by the checkpoint engine, that the interface agent quiesce itself;

returning, by the interface agent to the network application, an indicator that no packets are available regardless of whether or not packets are arriving at the input port;

determining, by the interface agent, if there are additional packets being processed by the network application and if not, setting an indication of quiescence in the active virtual machine and if so, continuing to check for additional packets being processed;

determining, by the checkpoint engine, if an indication of quiescence has been set, and if so, declaring a checkpoint, and if not, continuing to check for the quiescence indication;

if the checkpoint is declared, pause the active virtual machine;

copy memory data;

copy state data of the active virtual machine;

resume the active virtual machine; indicate the checkpoint is complete; restart the interface agent; and transfer a copy of memory data and the copy of state data from the active virtual machine to the standby virtual machine.

2. The method of claim 1 wherein the interface agent is a callable library.

3. The method of claim 2 wherein the callable library is a Data Plane development Kit (DPDK) library.

4. A method of bringing a standby virtual machine to an active state comprising the steps of:

determining, by a checkpoint engine of standby virtual machine, that the active virtual machine is no longer functioning properly;

promoting, by the standby virtual machine, itself to be the active virtual machine; applying most recent checkpoint received from the improperly functioning active virtual machine;

setting a failover flag by newly-promoted active virtual machine;

starting newly-active virtual machine at a state set by last checkpoint;

initializing in the newly active virtual machine, by an interface agent, a network adapter hardware and a memory buffer holding incoming packets when the interface agent detects that the failover occurred flag has been set; and continuing with normal processing.

5. A method for checkpointing in a network device having an active virtual machine, and a standby virtual machine, a network application on the active virtual machine; a checkpoint engine on the active virtual machine; and an interface agent on the active virtual machine, the method comprising the steps of:

determining, by the checkpoint engine, that a checkpoint is required; stopping receipt of packets by the interface agent;

determining, by the interface agent, if there are additional packets being processed by the network application and if not, indicating quiescence;

declaring a checkpoint by the checkpoint engine, if an indication of quiescence has been set;

pausing the active virtual machine by the hypervisor;

copying memory and state data of the active virtual machine, by the hypervisor;

resuming, by the hypervisor, the active virtual machine;

restarting the interface agent by the checkpoint engine; and transferring, by the checkpoint engine, the copy of memory and the state data from the active virtual machine to the standby virtual machine.

* * * * *